US008248566B2

(12) United States Patent
Song

(10) Patent No.: US 8,248,566 B2
(45) Date of Patent: Aug. 21, 2012

(54) LIQUID CRYSTAL DISPLAY

(75) Inventor: Jang-Kun Song, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 12/828,790

(22) Filed: Jul. 1, 2010

(65) Prior Publication Data

US 2010/0265423 A1    Oct. 21, 2010

Related U.S. Application Data

(63) Continuation of application No. 11/833,062, filed on Aug. 2, 2007, now Pat. No. 8,031,286, which is a continuation of application No. 10/205,326, filed on Jul. 25, 2002, now Pat. No. 7,460,191.

(30) Foreign Application Priority Data

Nov. 22, 2001  (KR) .................................. 2001-72885

(51) Int. Cl.
  *G02F 1/136*  (2006.01)
  *G02F 1/1337*  (2006.01)
(52) U.S. Cl. ........... 349/144; 349/48; 349/129; 349/130
(58) Field of Classification Search .................... 349/48, 349/129, 130, 144
  See application file for complete search history.

(56) References Cited

U.S. PATENT DOCUMENTS

| 4,878,742 A | 11/1989 | Ohkubo et al. |
| 5,434,690 A | 7/1995 | Hisatake et al. |
| 5,576,863 A | 11/1996 | Aoki et al. |
| 5,598,285 A | 1/1997 | Kondo et al. |
| 5,608,556 A * | 3/1997 | Koma ........................... 349/143 |
| 5,737,051 A | 4/1998 | Kondo et al. |

(Continued)

FOREIGN PATENT DOCUMENTS

DE    199 25 985 A1    12/2000

(Continued)

OTHER PUBLICATIONS

Office Action dated Jan. 19, 2011 for U.S. Appl. No. 11/833,062.

(Continued)

*Primary Examiner* — Michael Caley
(74) *Attorney, Agent, or Firm* — F. Chau & Associates, LLC

(57) ABSTRACT

A liquid crystal display includes a first insulating substrate, and a second insulating substrate facing the first insulating substrate. Gate lines are formed on the first insulating substrate while extending in a horizontal direction. A gate insulating layer is formed on the gate lines. A semiconductor layer and data lines are formed on the gate insulating layer. The data lines extend in a vertical direction. Source electrodes are formed on the semiconductor layer while being connected to the data lines. Drain electrodes face the source electrodes. A protective layer is formed on the data lines, and pixel electrodes are formed on the protective layer such that the pixel electrodes are connected to the drain electrodes while having a plurality of slits and horizontal opening portions. A common electrode is formed on the second insulating substrate with a plurality of opening portions. The horizontal opening portions of the pixel electrode and the opening portions of the common electrode partition the pixel region into left and right domains as well as upper and lower domains. The slits are positioned at the left and right domains.

20 Claims, 13 Drawing Sheets

U.S. PATENT DOCUMENTS

| | | | |
|---|---|---|---|
| 5,757,454 A | 5/1998 | Ogishima et al. | |
| 5,777,700 A * | 7/1998 | Kaneko et al. | 349/39 |
| 5,870,611 A | 2/1999 | London Shrader et al. | |
| 5,953,093 A | 9/1999 | Hirata et al. | |
| 6,100,953 A | 8/2000 | Kim et al. | |
| 6,104,450 A * | 8/2000 | Hiraishi | 349/48 |
| 6,124,915 A | 9/2000 | Kondo et al. | |
| 6,195,140 B1 | 2/2001 | Kubo et al. | |
| 6,285,431 B2 | 9/2001 | Lyu et al. | |
| 6,341,004 B1 | 1/2002 | Kondo et al. | |
| 6,466,288 B1 | 10/2002 | Rho | |
| 6,509,944 B2 | 1/2003 | Koma et al. | |
| 6,650,390 B2 | 11/2003 | Sakamoto et al. | |
| 6,661,488 B1 | 12/2003 | Takeda et al. | |
| 6,704,083 B1 | 3/2004 | Kim et al. | |
| 6,724,455 B2 | 4/2004 | Kondo et al. | |
| 6,809,787 B1 | 10/2004 | Seo et al. | |
| 6,930,739 B2 | 8/2005 | Takeda et al. | |
| 6,940,573 B2 | 9/2005 | Um et al. | |
| 7,019,806 B2 | 3/2006 | Um et al. | |
| 7,079,210 B2 | 7/2006 | Um et al. | |
| 7,180,562 B2 | 2/2007 | Kim et al. | |
| 2001/0004280 A1 | 6/2001 | Kim et al. | |
| 2001/0033353 A1* | 10/2001 | Shimoshikiryo | 349/129 |
| 2001/0050746 A1 | 12/2001 | Song | |
| 2001/0052949 A1 | 12/2001 | Yamaguchi et al. | |
| 2003/0197177 A1 | 10/2003 | Baek et al. | |
| 2004/0189923 A1 | 9/2004 | Kondo et al. | |
| 2008/0303997 A1 | 12/2008 | Takeda et al. | |

FOREIGN PATENT DOCUMENTS

| | | |
|---|---|---|
| EP | 1006394 A1 | 11/1999 |
| EP | 0568355 | 6/2000 |
| EP | 0621501 | 11/2002 |
| JP | 05-045636 | 2/1993 |
| JP | 06-265939 | 9/1994 |
| JP | 06-301036 | 10/1994 |
| JP | 06-332009 | 12/1994 |
| JP | 07-013164 | 1/1995 |
| JP | 07-020469 | 1/1995 |
| JP | 07-028063 | 1/1995 |
| JP | 07-064089 | 3/1995 |
| JP | 07-152013 | 6/1995 |
| JP | 07-230097 | 8/1995 |
| JP | 071999190 | 8/1995 |
| JP | 07-311383 | 11/1995 |
| JP | 08-006052 | 1/1996 |
| JP | 08-029812 | 2/1996 |
| JP | 08-076125 | 3/1996 |
| JP | 08-101399 | 4/1996 |
| JP | 08-179341 | 7/1996 |
| JP | 08-179342 | 7/1996 |
| JP | 08-220511 | 8/1996 |
| JP | 09-043609 | 2/1997 |
| JP | 09-043610 | 2/1997 |
| JP | 09-43610 | 2/1997 |
| JP | 09-160061 | 6/1997 |
| JP | 09-189922 | 7/1997 |
| JP | 11-109391 | 4/1999 |
| JP | 11-352483 | 12/1999 |
| JP | 2000-010110 | 1/2000 |
| JP | 2000-193977 | 7/2000 |
| JP | 2000-275647 | 10/2000 |
| JP | 2001-109009 | 4/2001 |
| JP | 2001-188234 | 7/2001 |
| JP | 2001-188242 | 7/2001 |
| JP | 2001-264786 | 9/2001 |
| JP | 2001-330833 | 11/2001 |
| KR | 0157237 | 7/1998 |
| KR | 1999006951 | 1/1999 |
| KR | 1999-011943 | 2/1999 |
| KR | 1999-0084238 | 12/1999 |
| KR | 1020000009518 | 2/2000 |
| KR | 1020000059783 | 10/2000 |
| KR | 1020010059954 | 7/2001 |
| KR | 1020010090458 | 10/2001 |
| KR | 1020010104069 | 11/2001 |
| KR | 1020020017312 | 3/2002 |
| KR | 1020030008044 | 1/2003 |
| KR | 10-0662059 | 12/2006 |
| WO | WO 00/55685 | 9/2000 |

OTHER PUBLICATIONS

European Search Report dated Mar. 3, 2011 for European Application No. 10168932.1.

* cited by examiner

LIQUID CRYSTAL DISPLAY

CROSS-REFERENCE TO RELATED UNITED STATES APPLICATION

This application is a continuation of U.S. patent application Ser. No. 11/833,062 filed Aug. 2, 2007, now U.S. Pat. No. 8,031,286 which is a continuation of U.S. patent application Ser. No. 10/205,326 filed Jul. 25, 2002, now U.S. Pat. No.: 7,460,191 which claims priority to Korean Application 2001-72885, filed Nov. 22, 2001, the disclosures of which are incorporated by reference herein in their entirety.

BACKGROUND OF THE INVENTION (a) Field of the Invention

The present invention relates to a liquid crystal display, and more particularly, to a liquid crystal display for widening a viewing angle.

(b) Description of the Related Art

Generally, a liquid crystal display has two panels with electrodes, and a liquid crystal layer interposed between the two panels. Voltages are applied to the electrodes so that the liquid crystal molecules in the liquid crystal layer are re-oriented to thereby control light transmission.

Liquid crystal displays are widely used because they exhibit excellent display characteristics, but they do have a major shortcoming when their viewing angle is narrow. Various techniques for widening the viewing angle have been developed.

For instance, liquid crystal molecules may be aligned perpendicular to top and the bottom panels while forming a predetermined pattern of openings or protrusions at a pixel electrode and a common electrode.

In the case of formation of the opening pattern, the liquid crystal molecules are controlled in orientation by way of a fringe field due to the opening pattern formed at the pixel electrodes and/or the common electrode.

In the case of formation of the protrusion pattern, protrusions are formed at the pixel electrode and/or the common electrode, and the liquid crystal molecules are controlled in orientation by way of electric field deformed due to the protrusion pattern.

Furthermore, it is proposed that an opening pattern is formed at the pixel electrode while forming a protrusion pattern at the common electrode. The liquid crystal molecules are controlled in orientation by way of the fringe field due to the opening pattern and the protrusion pattern while forming a plurality of domains.

In such a multi-domain liquid crystal display, the viewing angle per contrast ratio of 1:10 or the viewing angle defined as the limit angle of the inter-gray scale brightness inversion reaches 80° or more in all directions. However, if the lateral gamma curve is deviated from the front gamma curve, visibility at left and right sides is deteriorated, even when compared to the twisted nematic (TN) mode liquid crystal display. For instance, in a patterned vertically aligned (PVA) mode where opening portions are formed for the domain partitioning, the display becomes much brighter as it comes to the lateral side, and the color becomes white. In a serious case, the bright gray scales are removed while conglomerating the picture images. Thus, it is desirable to reduce deterioration of colors on the left and right sides, thereby enhancing the image quality of an LCD.

SUMMARY OF THE INVENTION

According to one aspect of the present invention, the liquid crystal display has a plurality of pixel regions. Each pixel region has a plurality of micro domains. The micro domains include a first directional domain and a second directional domain having different average inclination directions of liquid crystal molecules when electric field is applied. The electric field within the first directional domain is weaker than the electric field within the second directional domain.

When viewed from a front side, the liquid crystal molecules in the first directional domain are inclined left and right while the liquid crystal molecules in the second directional domain are inclined up and down. The predetermined value of difference in the electric field between the first directional domain and the second directional domain ranges from about 0.02/d (V/µm) to about 0.5/d (V/µm) where d is a cell gap (µm).

According to another aspect of the present invention, the liquid crystal display has a first insulating substrate, and a first signal line formed on the first insulating substrate in a first direction. A second signal line is formed on the first insulating substrate in a second direction while intersecting the first signal line in an insulating manner. A first thin film transistor is connected to the first and the second signal lines. A second thin film transistor is connected to the first and the second signal lines. A first pixel electrode is connected to the first thin film transistor. A second pixel electrode is connected to the second thin film transistor. A second insulating substrate faces the first insulating substrate. A common electrode is formed on the second insulating substrate. A liquid crystal layer is interposed between the first and the second substrates. A domain partitioning member is formed on at least one of the first and the second insulating substrates while partitioning the first and the second pixel electrodes into a plurality of micro domains. The domain partitioning member partitions the first and the second pixel electrodes into first directional domains and second directional domains, and the first and the second pixel electrodes are connected through a capacitor.

The first and the second thin film transistors at a pixel of an nth pixel row and an m-th pixel column are connected to an m-th data line, and the first and the second thin film transistors at a pixel of an (n+1)-th pixel row and the m-th pixel column are connected to an (m+1)-th data line wherein n and m are integers. The second pixel electrode occupies the first and second pixel electrode by about 30-70%. The liquid crystal molecules in the liquid crystal layer are vertically aligned with respect to the first and the second insulating substrates in absence of an electric field.

A storage capacitor line is further formed on the first insulating substrate while being placed between the first pixel electrode and the second pixel electrode to thereby form a storage capacitor. When a liquid crystal capacitance formed between the second pixel electrode and a common electrode is indicated by Clcb, a storage capacitance formed between the second pixel electrode and the storage capacitor line is indicated by Cstb, and a connection capacitance formed between the first and the second pixel electrodes is indicated by Cpp, a value of T defined by the equation T=(Clcb+Cstb−Cpp)/(Clcb+Cstb+Cpp) is in the range of about 0.65-0.95.

According to still another aspect of the present invention, the liquid crystal display has a first insulating substrate, and a first signal line formed at the first insulating substrate in a first direction. A second signal line is formed at the first insulating substrate in a second direction while crossing over the first signal line. A thin film transistor is connected to the first and the second signal lines. A pixel electrode is connected to the thin film transistor. A second insulating substrate faces the first insulating substrate. A common electrode is formed at the second insulating substrate. A liquid crystal layer is interposed between the first and the second substrates. A domain partitioning member is formed on at least one of the first and the second insulating substrates while partitioning the pixel electrode into a plurality of micro domains. The domain partitioning member partitions the pixel electrode into first directional domains and second directional domains, and the first directional domains includes a plurality of slits.

A width of the slit is is about 2-5 µm, and the distance between the neighboring two slits is established to be 2-10 µm. When electric field is applied to the liquid crystal display, the electric field applied to the first directional domain is weaker than the electric field applied to the second directional domain. A difference in the electric field between the first directional domain and the second directional domain ranges from about 0.02/d (V/µm) to about 0.5/d (V/µm), wherein d is a cell gap (µm). The plurality of micro domains are formed by overlapping the common electrode having a plurality of opening portions and the pixel electrode, wherein the pixel electrode comprises a plurality of electrode portions. Polarizing plates are further comprised, which are attached to outer surfaces of the first insulating substrate and the second insulating substrate.

According to still another aspect of the present invention, the liquid crystal display has a first insulating substrate, and a first signal line formed at the first insulating substrate in a first direction. A second signal line is formed at the first insulating substrate in a second direction while crossing the first signal line in an insulating manner. A thin film transistor is connected to the first and the second signal lines. A pixel electrode is connected to the thin film transistor. A second insulating substrate faces the first insulating substrate. A common electrode is formed at the second insulating substrate. A dielectric layer is formed on at least one of the pixel electrode and the common electrode. A liquid crystal layer is interposed between the first and the second substrates. A domain partitioning member is formed on at least one of the first and the second insulating substrates while partitioning the pixel electrode into a plurality of micro domains. The domain partitioning member partitions the pixel electrode into first directional domains and second directional domains, and the dielectric layer is placed on the first directional domains.

A thickness of the dielectric layer is about 500 Å-1.5 µm. A plurality of opening portions are formed at the pixel electrode and the common electrode as the domain partitioning member.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF PREFERRED EMBODIMENTS

Preferred embodiments of this invention will be explained with reference to the accompanying drawings.

Figure 1:
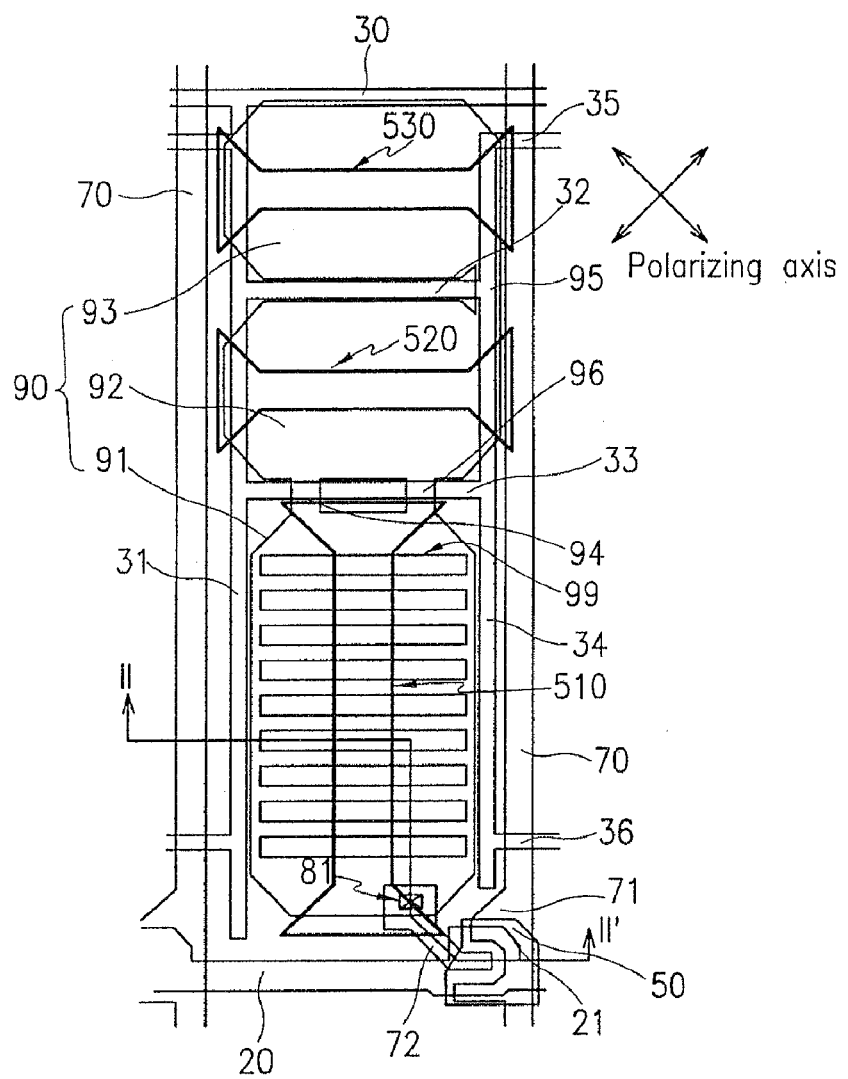
FIG. 1 is a plan view of a liquid crystal display according to a first preferred embodiment of the present invention.
Figure 2:
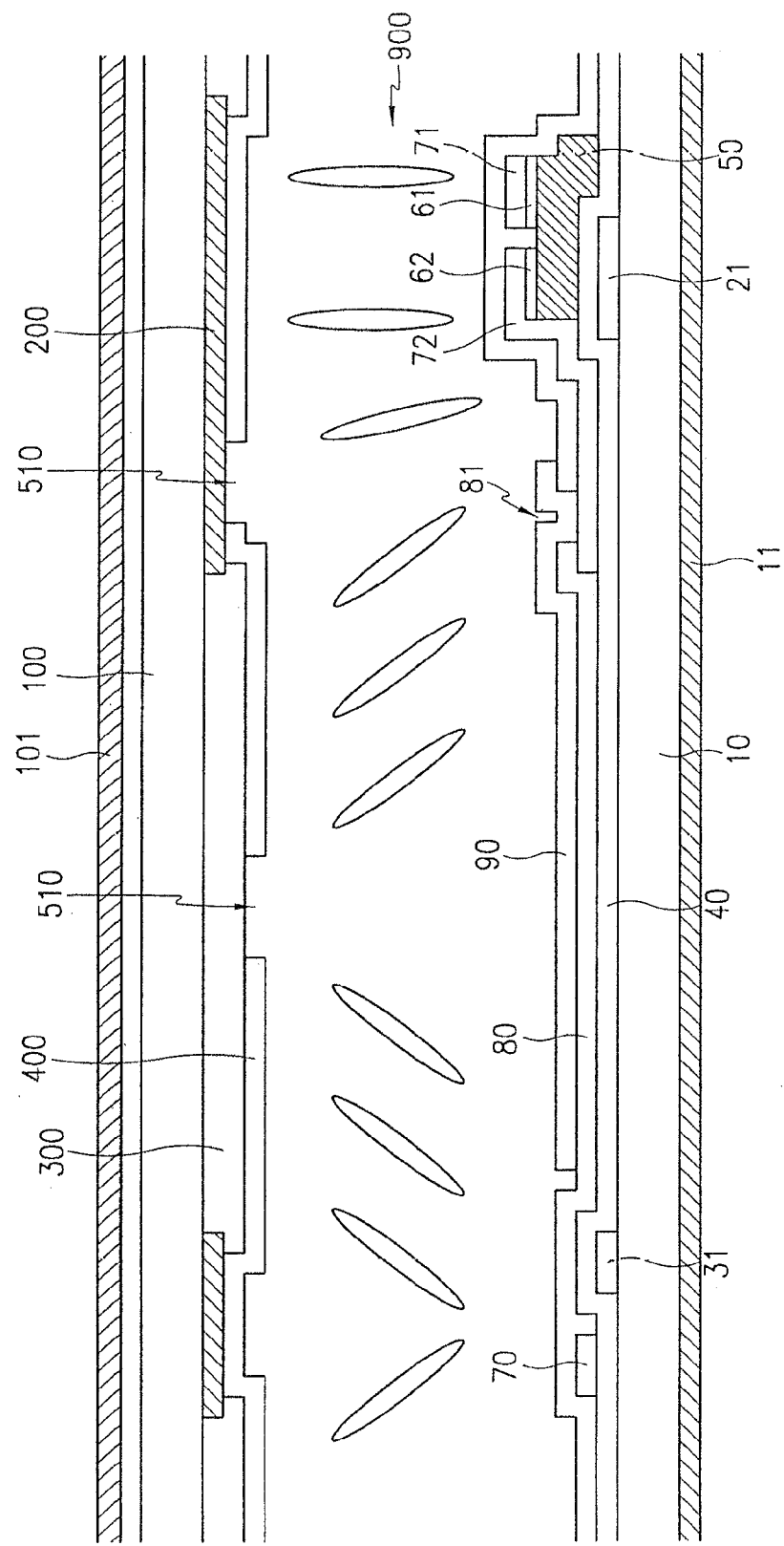
FIG. 2 is a cross sectional view of the liquid crystal display taken along the II-II' line of FIG. 1.

FIG. 1 is a plan view of a liquid crystal display according to a first preferred embodiment of the present invention, and FIG. 2 is a cross sectional view of the liquid crystal display taken along the II-II' line of FIG. 1.

Referring to FIGS. 1 and 2, the liquid crystal display includes a thin film transistor array panel having a transparent insulating substrate 10, a color filter panel having a transparent glass substrate 100, and liquid crystal material 900 disposed between the thin film transistor array panel and the color filter panel. First, the thin film transistor array panel for the liquid crystal display will be explained in detail.

Gate lines 20 are formed on a transparent insulating substrate 10 such as a glass while extending in the horizontal direction. Storage capacitor lines 30 extend parallel to the gate lines 20. Gate electrodes 21 protrude from the gate lines 20. First to fourth storage capacitor electrodes 31-34 and storage capacitor electrode connectors 35 and 36 are branched from the storage capacitor lines 30. The first storage capacitor electrode 31 is directly connected to the storage capacitor line 30 while extending in the vertical direction. The second and the third storage capacitor electrodes 32 and 33 are connected to the first storage capacitor electrode 31 while extending in the horizontal direction. The fourth storage capacitor electrode 34 is connected to the second and the third storage capacitor electrodes 32 and 33 while extending in the vertical direction. The storage capacitor electrode connectors 35 and 36 connect the fourth storage capacitor electrode 34 to the first storage capacitor electrode 31 at the pixel adjacent thereto. A gate insulating layer 40 is formed on the gate lines 20, the gate electrodes 21, the storage capacitor lines 30, the first to fourth storage capacitor electrodes 31-34, and the storage capacitor electrode connectors 35 and 36, and a semiconductor layer 50 made of amorphous silicon is formed on the gate insulating layer 40 over the gate electrodes 21. Ohmic contact layers 61 and 62 made of amorphous silicon doped with n-type high concentration impurities such as phosphorous P is formed on the semiconductor layer 50.

Source and drain electrodes 71 and 72 are formed on the ohmic contact layers 61 and 62, respectively.

Data lines 70 are formed on the gate insulating layer 40 while extending in the vertical direction. The source electrodes 71 are connected to the data lines 70. A protective layer 80 is formed on the data lines 70, and source and drain electrodes 71 and 72 with contact holes 81 exposing the drain electrodes 72. A pixel electrode 90 is formed on the protective layer 80 at each pixel area while being connected to the drain electrode 72 through the contact hole 81. The pixel electrode 90 is formed with transparent conductive material such as indium tin oxide (ITO) and indium zinc oxide (IZO). Each pixel area is defined by the two gate lines 20 and the two data lines 70 while being partitioned into upper and lower half parts.

The pixel electrode 90 is separated into first to third electrode portions 91-93, which are connected to each other through first to third connectors 94-96. The first electrode portion 91 is located at a substantially lower half part of the pixel area, and has a substantially rectangular shape where the four edges thereof are cut off. The first electrode portion 91 is directly connected to the drain electrode 72 through the contact hole 81. The second and the third electrode portions 92 and 93 are located at a substantially upper half part of the pixel area, and have a substantially rectangular shape with the four chamfered corners. The second electrode portion 92 is connected to the first electrode portion 91 through the first and the second connectors 94 and 96, and the third electrode portion 93 is connected to the second electrode portion 92 through the third connector 95.

According to an embodiment of the present invention, a plurality of slits 99 are formed at the first electrode portion 91. The electric field generated between the first electrode portion 91 and a common electrode 400 of the color filter panel due to the slits 99 is weaker than that generated between the common electrode 400 and the second electrode portion 92 or the third electrode portion 93.

Meanwhile, the second storage capacitor electrode 32 is placed between the second electrode portion 92 and the third electrode portion 93, and the third storage capacitor electrode 33 is placed between the second electrode portion 92 and the first electrode portion 91. The first storage capacitor electrode 31 and the fourth storage capacitor electrode 34 are placed between the pixel electrode 90 and the data line 70. The side of the first electrode portion 91 extending parallel to the data line is longer than the side thereof extending parallel to the gate line. The side of the second and the third electrode portions extending parallel to the data line is shorter than the side thereof extending parallel to the gate line. The second and the third electrode portions 92 and 93 overlap the first and the fourth storage capacitor electrodes 31 and 34, but the first electrode portion 91 does not overlap the first and the fourth storage capacitor electrodes 31 and 34. The storage capacitor line 30 is placed between the gate line 20 and the third electrode portion 93. The electric potential to be applied to the common electrode 400 for the color filter panel is usually applied to the storage capacitor line 30, the storage capacitor electrodes 31-34, and the storage capacitor electrode connectors 35 and 36.

As described above, when the storage capacitor line 30 or the storage capacitor electrodes 31-34 to be applied with the common electric potential is placed between the data line 70 and the pixel electrode 90, or between the gate line 20 and the pixel electrode 90, the affection of the data line electric potential and the gate line electric potential to the electric field of the pixel region is intercepted by the storage capacitor line 30 and the storage capacitor electrodes 31-34, thereby forming stable domains.

The color filter panel for the liquid crystal display will be now explained in detail.

A black matrix 200 is formed on a transparent glass substrate 100 with a double-layered structure while defining the pixel areas. The double-layered structure for the black matrix 200 is formed with chrome/chrome oxide. A color filter 300 is formed at each pixel area, and a common electrode 400 is formed on the entire surface of the substrate 100 having the color filters 300 with a transparent conductive material. The common electrode 400 is provided with an opening pattern at each pixel area. The opening pattern includes first to third opening portions 510, 520, and 530. The first opening portion 510 bisects the lower half part of the pixel region in the vertical direction, and the second and the third opening portions 520 and 530 trisect the upper half part of the pixel region in the horizontal direction. Both ends of the respective opening portions 510, 520 and 530 are gradually enlarged while forming the shape of a triangle. The opening portions 510, 520, and 530 are separated from each other.

Alternatively, the black matrix may be formed with an organic material, and the color filters may be formed at the thin film transistor array panel.

The thin film transistor array panel and the color filter panel are aligned, and assembled with each other. Liquid crystal material 900 is injected between the two panels such that the directors of the liquid crystal molecules are aligned perpendicular to the panels. The two polarizing plates 11 and 101 are attached to the outer surfaces of the substrates 10 and 100, respectively, such that the polarizing axes thereof extend perpendicular to each other.

The electrode portions 91, 92 and 93 of the pixel electrode 90 at the thin film transistor array panel, and the first to third opening portions 510, 520, and 530 of the common electrode 400 at the color filter panel overlap each other to thereby partition the pixel region into a plurality of micro-domains. The micro-domains partitioned by the first electrode portion 91 and the first opening portion 510 are referred to as left and right domains (extending in a vertical direction), and the micro-domains partitioned by the second and third electrode portions 92 and 93 and the second and third opening portions 520 and 530 are referred to as upper and lower domains (extending in a horizontal direction). This distinction is made depending upon the inclination directions of the liquid crystal molecules when electric field is applied. The respective electrode portions 91-93 includes two long sides and two short sides. The long side of the each electrode portion extends parallel to the data line 70 or the gate line 20, and makes an angle of about 45° with respect to the polarizing axis of the polarizing plate (as shown in FIG. 1). In case the long side of the respective electrode portions 91-93 of the pixel electrode 90 is positioned close to the data line 70 or the gate line 20, the storage capacitor line 30 or the storage capacitor electrodes 31-34 are arranged between the data line 70 and the long side of the relevant electrode portion or the gate line 20 and the long side of the relevant electrode portion.

According to an embodiment of the present invention, it is preferable that the storage capacitor line 30 and the first to fourth storage capacitor electrode 31-34 are not positioned close to the short side of the electrode portions 91-93 of the pixel electrode 90. When the storage capacitor line 30 and the first to fourth storage capacitor electrode 31-34 are positioned closer, it is preferably completely covered by the pixel electrode 90, or positioned distant from the pixel electrode 90 by about 3 or more. The reason is that the electric potential of the data line 70 or the gate line 20 operates in the direction of hindering the domain formation at the area where the data line 70 or the gate line 20 is positioned close to the long side of the pixel electrode portions 91-93. On the contrary, the electric potential of the data line 70 or the gate line 20 operates in the direction of exerting the domain formation at the area where the data line 70 or the gate line 20 is positioned close to the short side of the pixel electrode portions 91-93.

Meanwhile, the electric field formed within the left and right domains due to the slit 99 at the first pixel electrode portions 91 is weaker than that formed within the upper and lower domains by a predetermined degree. With this structure, the visibility of the liquid crystal display at the left and the right sides can be improved. When the cell gap of the liquid crystal display is indicated by d (µm), the electric field formed within the left and right domains preferably generates a value of from about 0.02/d (V/µm) to about 0.5/d (V/µm), which is weaker than the electric field formed within the upper and lower domains. That is, the voltage difference between the common electrode and the pixel electrode is established such that the voltage at the left and right domains is weaker than that at the upper and lower domains by about 0.1V to about 1V. For this purpose, the width of the slit 99 is preferably established to be about 2 µm to 5 µm, and the distance between the neighboring two slits 99 is established to be about 2 µm to about 10 µm.

Figure 3:
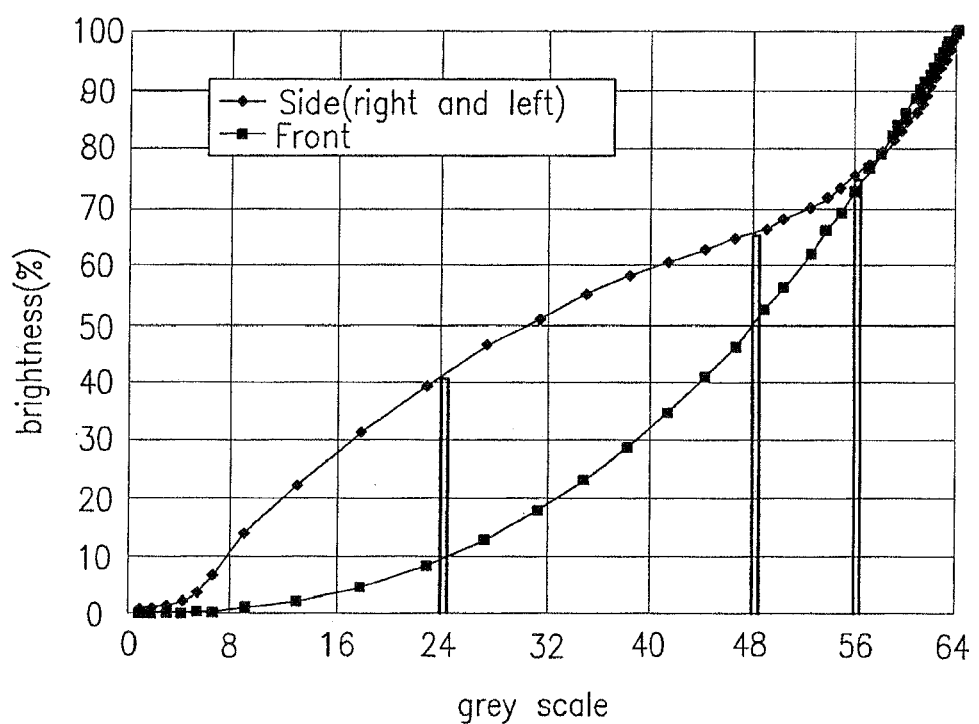
FIG. 3 is a graph illustrating gamma curves at a front and a 60° lateral sides of the test cell.

FIG. 3 is a graph illustrating gamma curves at the front and 60°-lateral sides of a test cell.

As shown in FIG. 3, the gamma curve at the 60°-lateral side of the test cell turns out to be higher than the gamma curve at the front side thereof. Particularly, as the width between the front side gamma curve and the lateral side gamma curve is significantly great, the brightness difference of two times to ten times is depended upon whether the same gray scale is viewed from the front side or from the lateral side.

Figure 5:
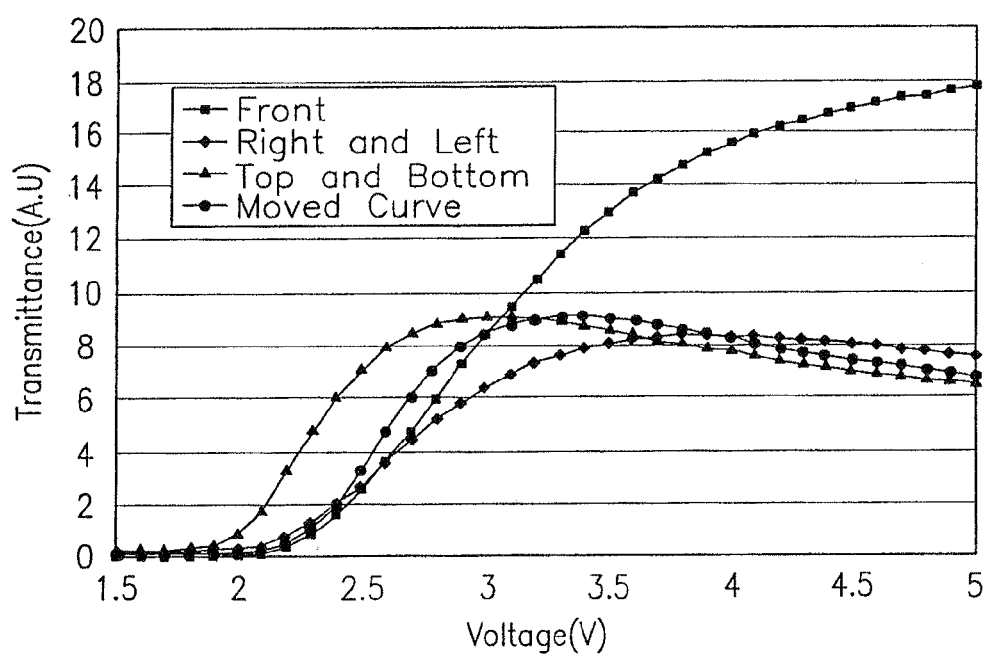
FIG. 5 illustrates a VT curve at the front of a single-domain VA liquid crystal cell where rubbing is vertically made in an anti-parallel manner, an average VT curve at left and right 60° sides thereof, an average VT curve at top and bottom 60° sides thereof, and a moved curve of the top and bottom average curve by 0.3V.

According to an embodiment of the present invention, as the gray scales of red, green, and blue pixels are separately varied, the deformation degree in the gamma curve at the lateral side is differentiated at the red, green and blue pixels. Therefore, when viewed from the lateral side, the pixels seem to have a different color compared with being viewed from the front side. For instance, as shown in FIG. 5, assuming that the red, green and blue pixels express 56 gray scales, 48 gray scales, and 24 gray scales, when viewed from the front side, the ratio of the red, green and blue colors is: R:G:B=73:50:10=55%:37%:8%. By contraries, when viewed from the 60°-lateral side, the ratio of the red, green and blue colors is: R:G:B=75:66:41=41%:36%:23%. That is, in the latter case, the content of the blue color becomes bigger by about three times or more so that the relevant pixel seems to be a different color.

In case the gamma curve is deformed as shown in FIG. 5, the low-proportioned color at the front side is increased at the lateral side. By contraries, the high-proportioned color at the front side is decreased at the lateral side. In this way, the ratio of the red, green and blue colors is approximated to each other. Consequently, the colors viewed from the front side become reduced in the difference in the color sensation when viewed from the lateral side. The colors become totally light while being approximated to a white color, and this is called a "white-shift." As a result, the color representation property becomes deteriorated, and the picture image appears to be cloudy. The most important cause of the white-shift is a deformation of the gamma curve at lower gray scales. When the deformation of the gamma curve is made at higher gray scales, it is extremely small. However, when the deformation of the gamma curve is made at lower gray scales of about 32 or less, the brightness difference is about two times to ten times, and this makes the white-shift appear serious.

Figure 4:
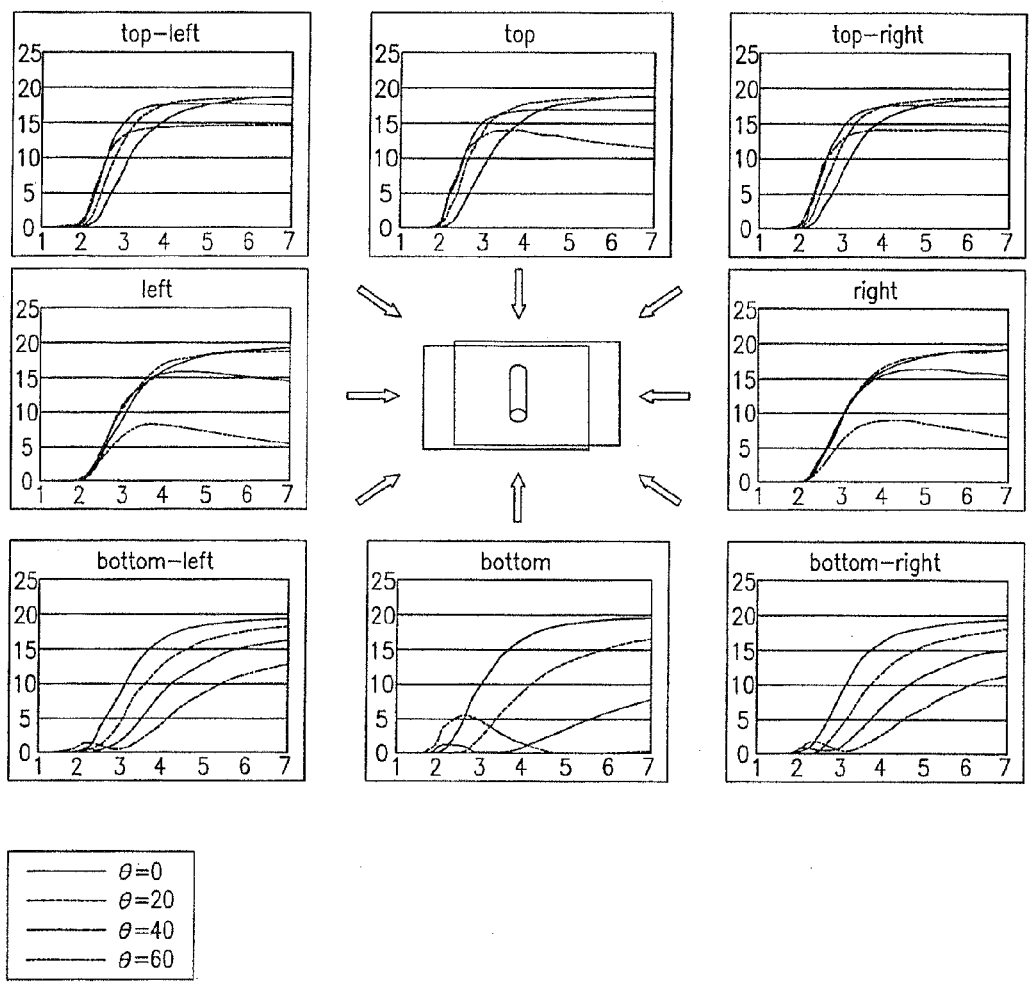
FIG. 4 illustrates VT (Voltage-Transmittance) curves when a single-domain vertically aligned (VA) liquid crystal cell is viewed from eight directions.

FIG. 4 illustrates VT(Voltage-Transmittance) curves when a single-domain vertically aligned liquid crystal cell is viewed from eight directions.

As shown in FIG. 4, the movement of the VT curve in a left direction with lower gray scales is significantly made at a top side or at a bottom side. At the left and right sides, the curve at the lower gray scales is elevated with the same outline as that at the front side. At the bottom-left side and the bottom-right side, the gray scale inversion is made early, and the VT curve again moves in the right direction while being elevated. That is, the phenomenon where the gamma curve is deformed upward with the lower gray scales becomes serious when the direction of viewing the liquid crystal cell and the inclination direction of the liquid crystal molecule under the application of the electric field are the same (when viewed from the head or tail of the liquid crystal molecule), but becomes negligible when those directions are perpendicular to each other. Therefore, the gamma curve deformation at the left and right domains is important in viciously influencing the viewing angle based on the visibility at the left and right sides, and the gamma curve deformation at the upper and lower domains is important in viciously influencing the viewing angle based on the visibility at the top and bottom sides. From the viewpoint of the user, the viewing angle at the left and right sides is more important than the viewing angle at the top and bottom sides. To compensate the gamma curve deformation at the left and right domains that viciously influences the left and right side visibility, the strength in the electric field within the left and right domains becomes weaker compared to that within the upper and lower domains. This will be now explained in detail.

FIG. 5 illustrates the VT curve at the front side of a single-domain VA cell where the rubbing is vertically made in an anti-parallel manner (the liquid crystal molecule being inclined up and downward), an average VT curve at the left and right 60° sides thereof, an average VT curve at the top and bottom 60° sides thereof, and a moved curve of the top and bottom average curve by about 0.3V.

As shown in FIG. 5, the VT curve at the left and right sides nearly coincide with the VT curve at the front side with the lower gray scales, but the VT curve at the top and bottom sides begins to elevate at lower voltages compared to the VT curve at the front side. That is, a threshold voltage (Vth) turns out to be lowered at the top and bottom sides, compared to that at the front side. However, when the VT curve at the top and bottom side moves by about 0.3V, it nearly agrees with the VT curve at the front side with the lower gray scales. The fact that the VT curve at the top and bottom sides agrees with the VT curve at the front side means that the visibility at the top and bottom sides is similar to the visibility at the front side. Therefore, to control the visibility at the left and right sides similar to the visibility at the front side, the left and right side VT curves at the left and right domains may move by a predetermined voltage. The same effect as with the movement of the left and right side VT curve can be obtained in case the electric field within the left and right domains is established to be weaker than the electric field within the upper and lower domains.

Figure 6:
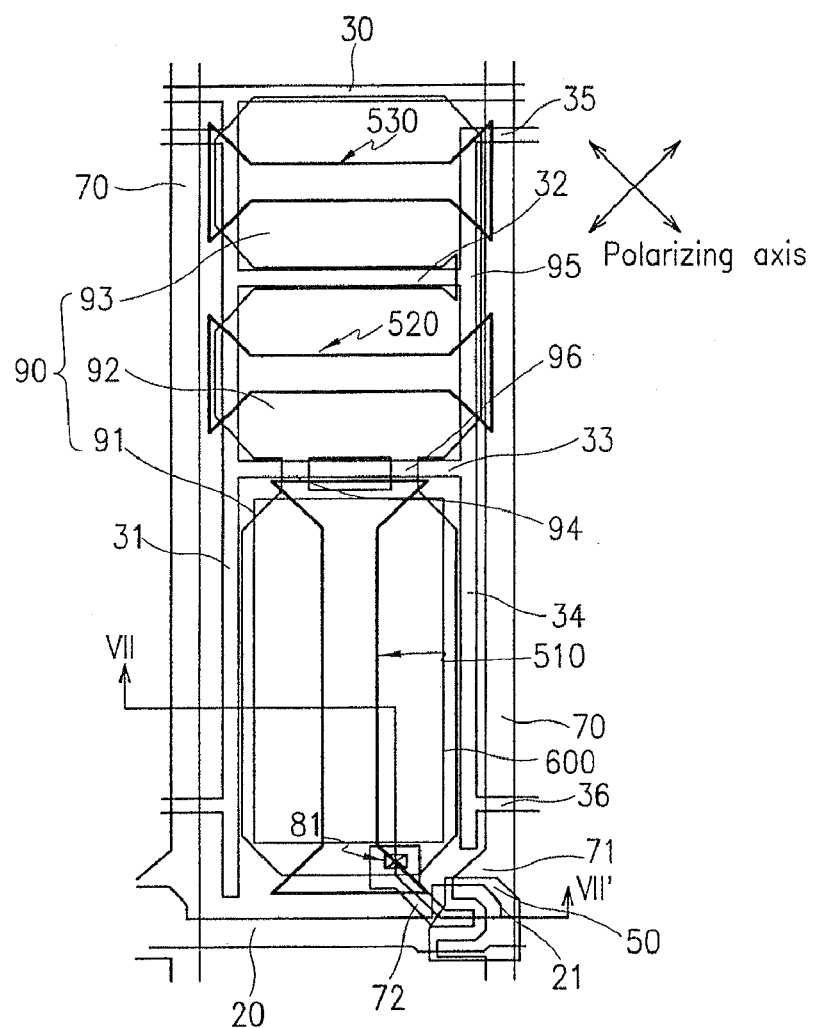
FIG. 6 is a plan view of a liquid crystal display according to a second preferred embodiment of the present invention.
Figure 7:
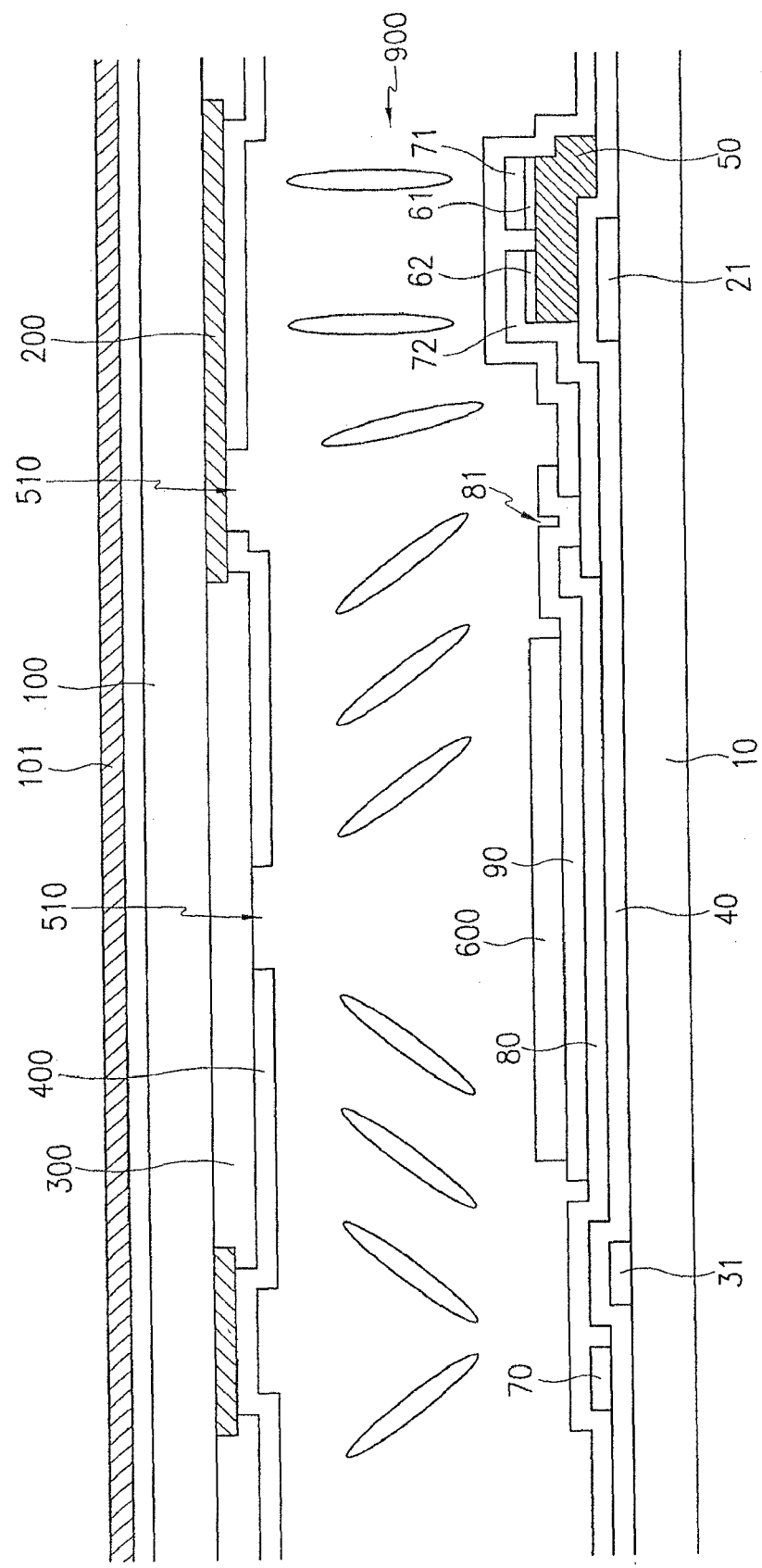
FIG. 7 is a cross sectional view of the liquid crystal display taken along the VII-VII' line of FIG. 6.

FIG. 6 is a plan view of a liquid crystal display having a thin film transistor array panel and a color filter panel according to a second preferred embodiment of the present invention, and FIG. 7 is a cross sectional view of the liquid crystal display taken along the VII-VII' line of FIG. 6.

As shown in FIGS. 6 and 7, in this preferred embodiment, other components and structures of the liquid crystal display are the same as those related to the first preferred embodiment except that a dielectric layer 600 is formed on the first pixel electrode portion 91 without forming any slit there.

The effect of forming the dielectric layer 600 on the first pixel electrode portion 91 is similar to that of forming slits at the first pixel electrode portion 91. That is, the electric field within the left and right domains is established to be weaker than that within the upper and lower domains. According to an embodiment of the present invention, the thickness of the dielectric layer 600 is preferably formed of about 500 Å to about 1.5 μm.

Figure 8:
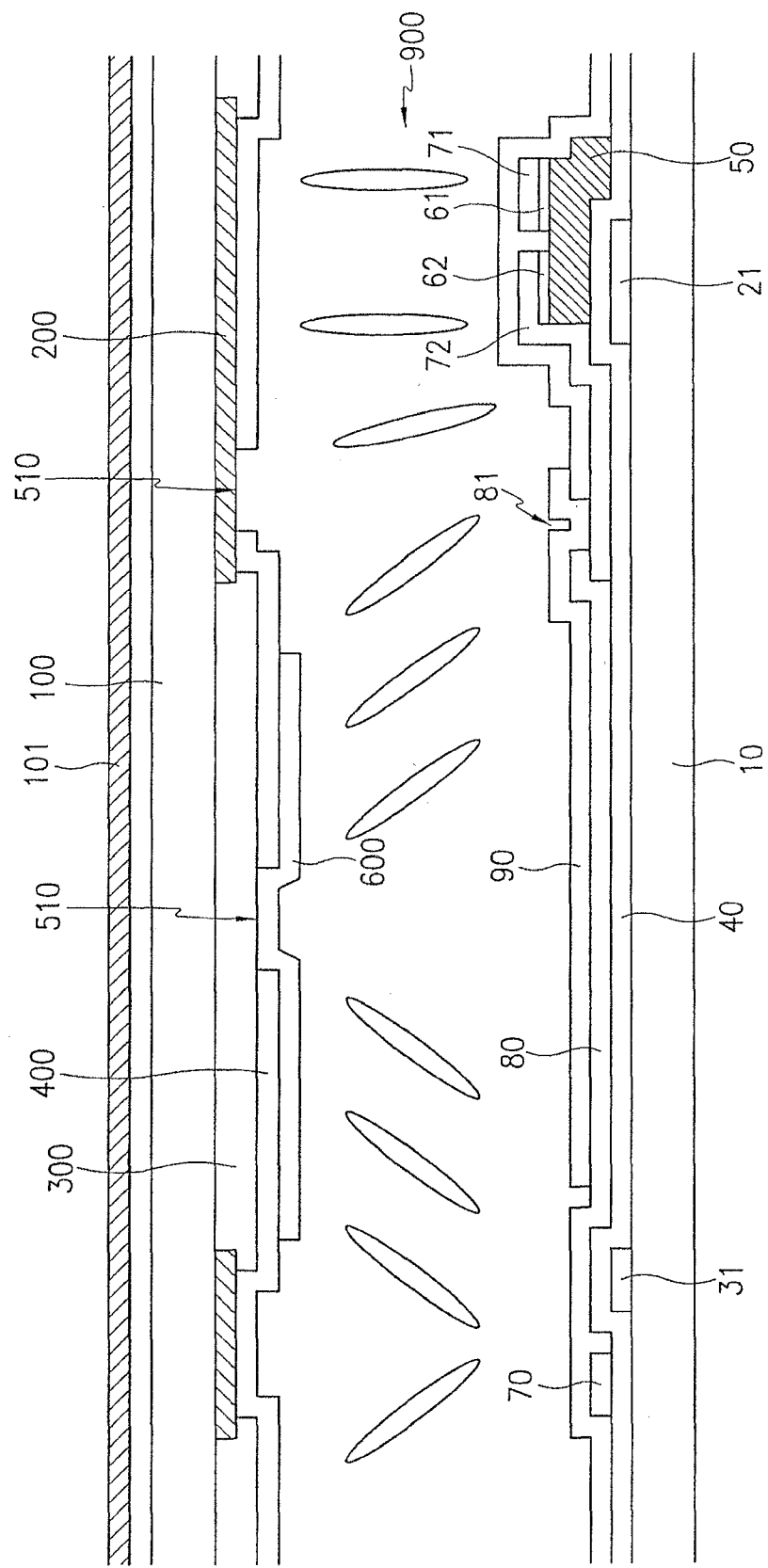
FIG. 8 is a cross sectional view of a liquid crystal display according to a third preferred embodiment of the present invention.

FIG. 8 is a sectional view of a liquid crystal display according to a third preferred embodiment of the present invention.

As shown in FIG. 8, in this preferred embodiment, other components and structures of the liquid crystal display are the same as those related to the first preferred embodiment except that a dielectric layer 600 is formed on the common electrode 400 while corresponding to the first pixel electrode portion 91 without forming any slit at the first pixel electrode portion 91.

The effect of forming the dielectric layer 600 on the common electrode 400 is similar to that of forming the slits at the first pixel electrode portion 91. That is, the electric field within the left and right domains is established to be weaker than that within the upper and lower domains.

Figure 9:
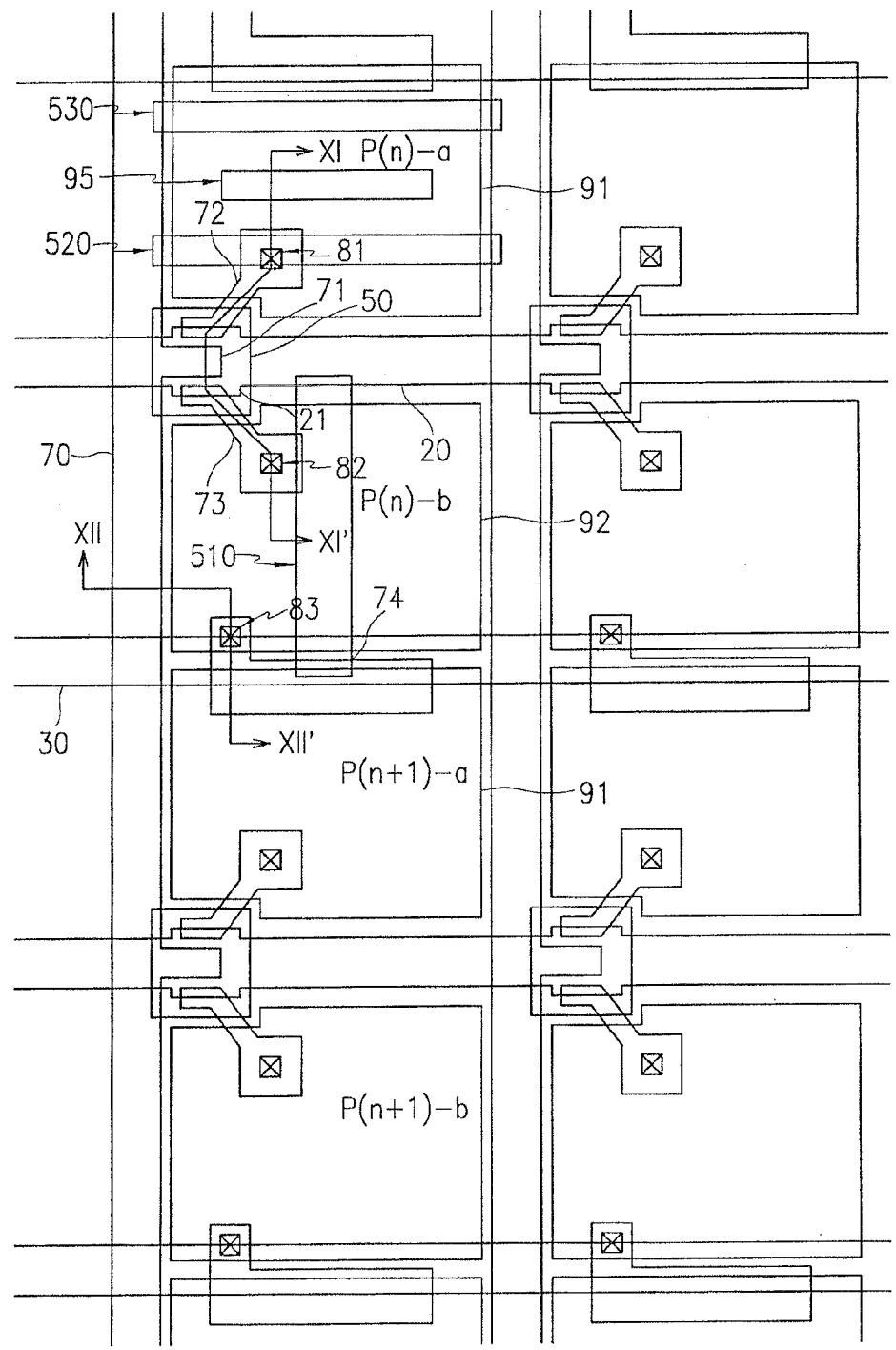
FIG. 9 is a plan view of a liquid crystal display according to a fourth preferred embodiment of the present invention.
Figure 10:
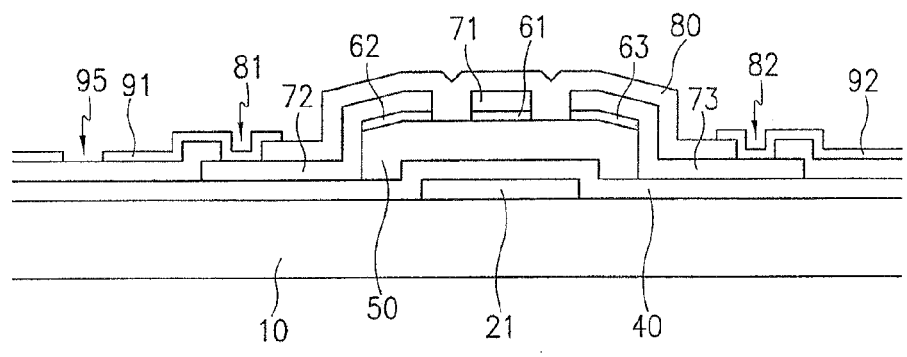
FIGS. 10 and 11 are cross sectional views of the liquid crystal display taken along the XI-XI' line and the XII-XII' line of FIG. 9.
Figure 11:
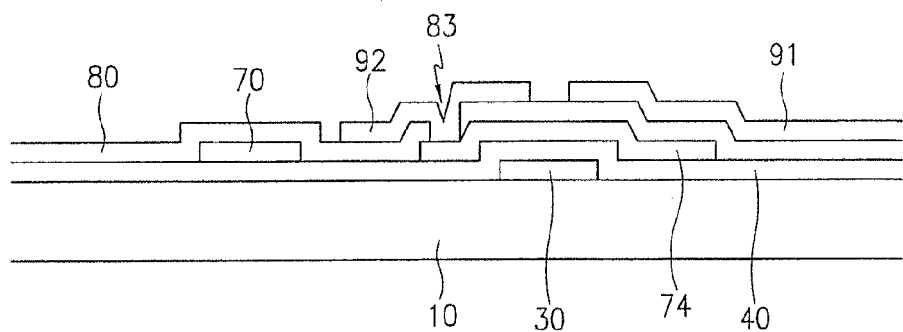
Figure 12:
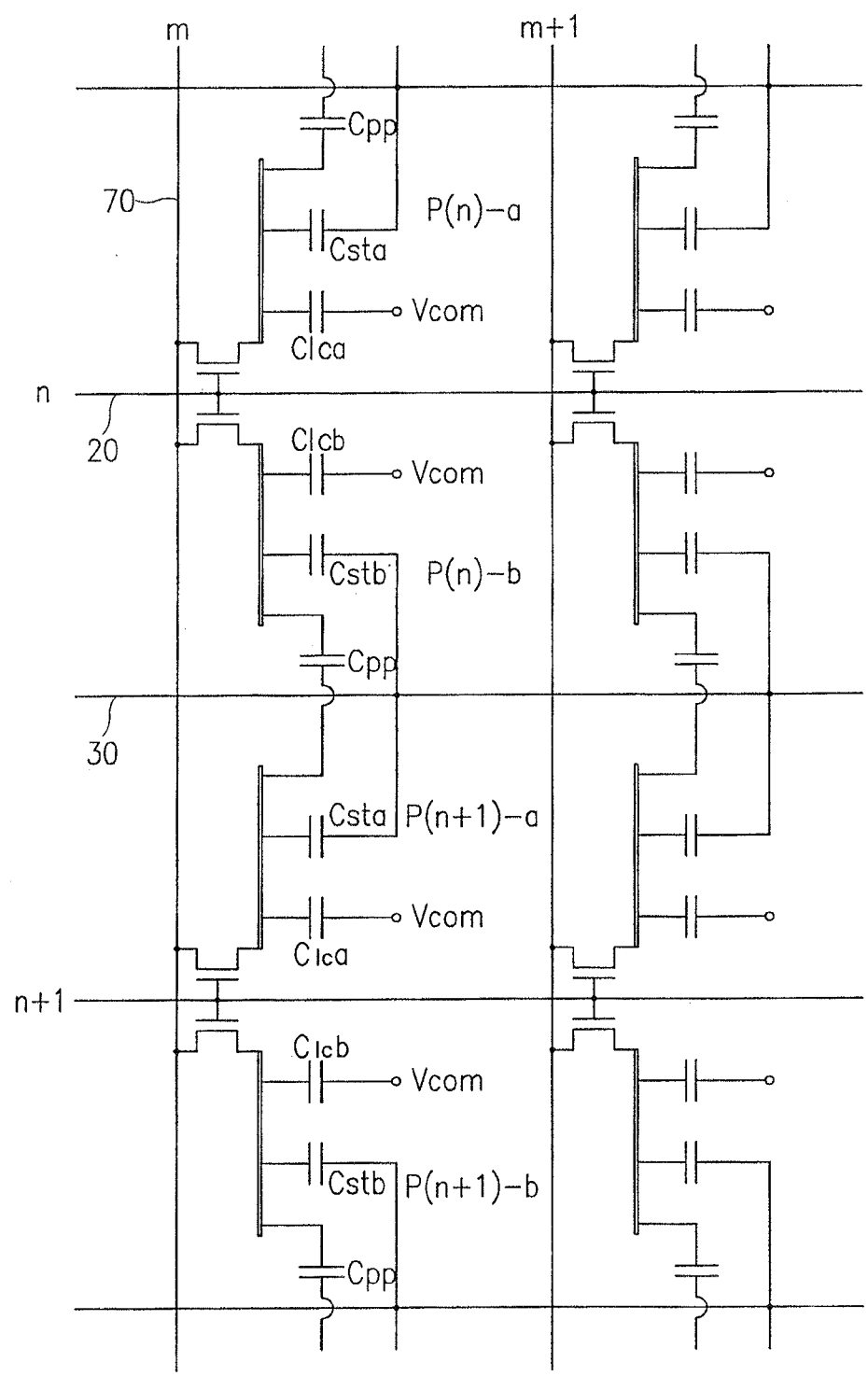
FIG. 12 is an equation circuit diagram of a liquid crystal display with the thin film transistor array panel shown in FIG. 9.

FIG. 9 is a plan view of a liquid crystal display having a thin film transistor array panel and a color filter panel according to a fourth preferred embodiment of the present invention, FIGS. 10 and 11 are cross sectional views of the thin film transistor array panel taken along the XI-XI' line and the XII-XII' line of FIG. 9, and FIG. 12 is an equation circuit diagram of a liquid crystal display with the thin film transistor array panel shown in FIG. 9.

First, the thin film transistor array panel for the liquid crystal display will be explained in detail.

A gate line assembly and storage capacitor lines 30 are formed at a transparent insulating substrate 10 such as glass.

The gate line assembly includes gate lines 20 extending in a horizontal direction, and gate electrodes 21 protruded from the gate lines 20 up and downward.

The storage capacitor line 30 extends parallel to the gate line 20. The storage capacitor line 30 may have a branch line.

The gate line assembly and the storage capacitor line 30 are covered by a gate insulating layer 40, and a semiconductor layer 50 made of amorphous silicon is formed on the gate insulating layer 40. The semiconductor layer 50 overlaps the gate electrode 21 to thereby form a channel portion for a thin film transistor. Ohmic contact layers 61, 62, and 63 made of amorphous silicon doped with n-type high concentration impurities such as phosphorous are formed on the semiconductor layer 50.

A data line assembly and connection electrodes 74 are formed on the ohmic contact layers 61, 62, and 63 and the gate insulating layer 40. The data line assembly includes data lines 70 extending along the semiconductor layer 50, source electrodes 71 connected to the data lines 70, and first and second drain electrodes 72 and 73. The source electrodes 71 protrude from the data lines 70 while being placed over the gate electrodes 21. The first and the second drain electrodes 72 and 73 are placed at both sides of the source electrode 71, respectively. The first and the second drain electrodes 72 and 73 are extended into first and second pixel regions around the gate line 20. The connection electrode 74 partially overlaps the storage capacitor line 30 while electro-magnetically interconnecting first and second pixel electrodes 91 and 92 separated around the storage capacitor line 30. The ohmic contact layers 61, 62, and 63 are located at the area where the semiconductor layer 50 overlaps the data line assembly.

A protective layer 80 is formed on the data line assembly. The protective layer 80 has first and second contact holes 81 and 82 exposing the one-sided ends of the first and second drain electrodes 72 and 73, and a third contact hole 83 exposing the one-sided end of the connection electrode 74.

First and second pixel electrodes 91 and 92 are formed on the protective layer 80 such that they are connected to the first and the second drain electrodes 72 and 73 through the first and the second contact holes 81 and 82. The second pixel electrode 92 is connected to the connection electrode 74 through the third contact hole 83. The first pixel electrode 91 is overlapped with the connection electrode 74 while making an electro-magnetic combination (capacitor-combination). The first and the second pixel electrodes 91 and 92 are capacitor-combined with each other by way of the connection electrode 74. The pixel electrodes 91 and 92 are made of transparent conductive material such as indium tin oxide (ITO) and indium zinc oxide (IZO). Meanwhile, the first pixel electrode 91 is provided with a plurality of horizontal opening portions 95 extending in the horizontal direction. Vertical opening portions can be formed at the second pixel electrode 92. The occupation ratio of the first pixel electrode within one pixel region is preferably established to be about 30% to about 70%.

The electric potential of a common electrode (not shown) counter to the first and second pixel electrode 91 and 92 is usually applied to the storage capacitor line 30.

In the meantime, the color filter panel is provided with a black matrix (not shown), color filters (not shown) and a common electrode (not shown). First to third opening portions 510, 520, and 530 are formed at the common electrode. The first opening portion 510 extends in the vertical direction such that it bisects the second pixel electrode 92 into left and right domains. The second and the third opening portions 520 and 530 trisect the first pixel electrode 91 up and downward. Consequently, the first pixel electrode 91 are vertically partitioned into four domains by way of the second and the third opening portions 520 and 530, and the horizontal opening portion 95.

The connection electrode 74 is formed on the same plane as the data line assembly having the data lines 70, the source electrode 71, and the first and second drain electrodes 72 and 73. Alternatively, the connection electrode 74 may be formed on the same plane as the gate line assembly having the gate lines 20 and the gate electrodes 21. In the latter case, the storage capacitor line 30 should not overlap the connection electrode 74.

The thin film transistor array panel is spaced apart from the color filter panel with a predetermined distance, and liquid crystal material is injected between the two panels.

A compensation film (not shown) such as a biaxial film is attached to the color filter panel. Two polarizing plates (not shown) are attached to the outer surfaces of the thin film transistor array panel and the color filter panel, respectively.

As described above, two thin film transistors and two pixel electrodes are formed at one pixel region, and the two pixel electrodes at the pixel neighbors are capacitor-connected to each other by way of a connection electrode. In this structure, excellent visibility can be obtained even when viewed from the left and right sides. This is because the voltage of the second pixel electrode 92 for the left and right domains is kept to be lower than the voltage of the first pixel electrode 91 so that the electric field within the left and right domains is weaker than that within the upper and lower domains.

The reason that the voltage of the second pixel electrode 92 for the left and right domains is kept to be lower than that of the first pixel electrode 91 for the upper and lower domains will be now explained with reference to FIG. 12.

In FIG. 12, Clca indicates a liquid crystal capacitance formed between the first pixel electrode 91 and the common electrode, Csta indicates a storage capacitance formed between the storage capacitor line 30 and the first pixel electrode P(n)-a, Clcb indicates a liquid crystal capacitance formed between the second pixel electrode P(n)-b and the common electrode, Cstb indicates a storage capacitance formed between the storage capacitor line 30 and the second pixel electrode P(n)-b, and Cpp indicates a connection capacitance between the first pixel electrode P(n)-a and the second pixel electrode P(n)-b.

As shown in FIG. 12, the first and the second thin film transistors are connected to the same gate lines 20 and data lines 70, and the first and the second pixel electrodes P(n)-a, and P(n)-b are connected to the first and the second thin film transistors, respectively. The first and the second pixel electrodes P(n)-a, and P(n)-b make capacitor-connection (Cpp) with respect to each other while interposing the storage capacitor line 30 therebetween.

In relation to one data line 70, when the nth gate line 20 becomes to be "on", two thin film transistor (TFT) channels become to be "on" so that voltage is applied to the first and the second pixel electrodes P(n)-a, and P(n)-b. As the P(n)-b is capacitor-connected to the P(n+1)-a, it is affected by the on-state of the latter. In this connection, the voltages of P(n)-a and P(n)-b can be given by way of mathematical formulas 1 and 2.

$$V[P(n)\text{-}a] = Vd(n) \quad (1)$$

$$V[P(n)\text{-}b] = Vd(n) + [Vd(n+1) - V'd(n+1)]Cpp/(Clcb + Cstb + Cpp) \quad (2)$$

In the mathematical formulas 1 and 2, Vd(n) indicates a voltage applied to the data line to drive the P(n) pixel, and Vd(n+1) indicates a voltage applied to the data line to drive the P(n+1) pixel. Furthermore, the V'd(n+1) indicates a voltage applied to the P(n+1) pixel at the previous frame.

As expressed in the mathematical formulas 1 and 2, the voltage applied to the P(n)-b pixel differs from the voltage applied to the P(n)-a pixel. Particularly, in case dot inversion driving or line inversion driving is made while the next pixel row expressing the same gray scale as with the previous pixel row (practically, most of the pixels being similar to this case), Vd(n)=−Vd(n+1), and Vd(n)=−V'd(n) (assuming that the common electrode voltage is the earth voltage). Therefore, the mathematical formula 2 can be expressed by the following mathematical formula 3:

$$V[P(n)\text{-}b] = Vd(n) - 2Vd(n)Cpp/(Clcb+Cstb+Cpp) = [(Clcb+Cstb-Cpp)/(Clcb+Cstb+Cpp)]Vd(n) = TVd(n) \quad (3)$$

where T=(Clcb+Cstb−Cpp)/(Clcb+Cstb+Cpp).

It can be known from the mathematical formula 3 that the voltage applied to the P(n)-b pixel is lower than that applied to the P(n)-a pixel. The value of T is preferably established to be about 0.65 to about 0.95.

Figure 13:
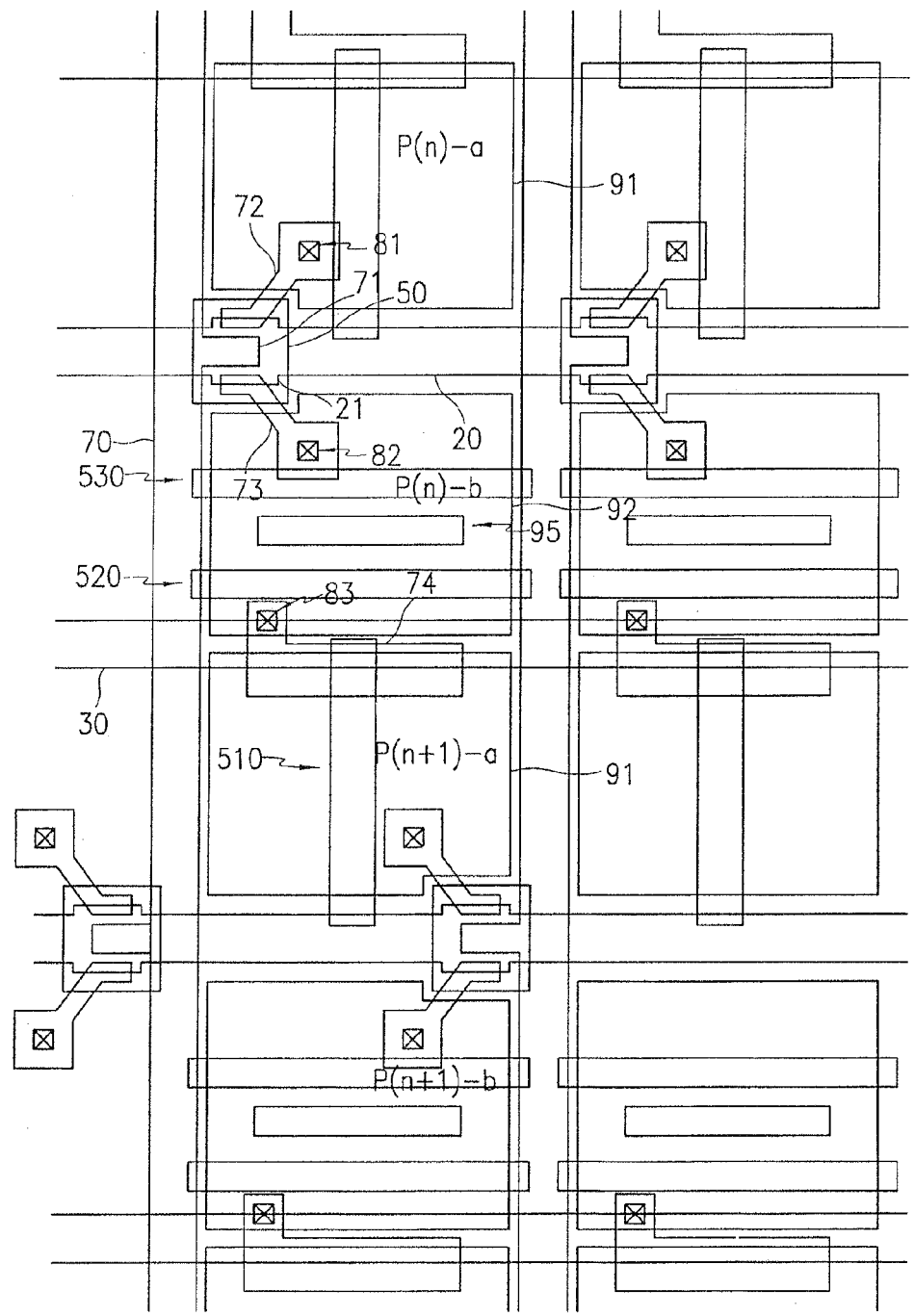
FIG. 13 is a plan view of a liquid crystal display according to a fifth preferred embodiment of the present invention.
Figure 14:
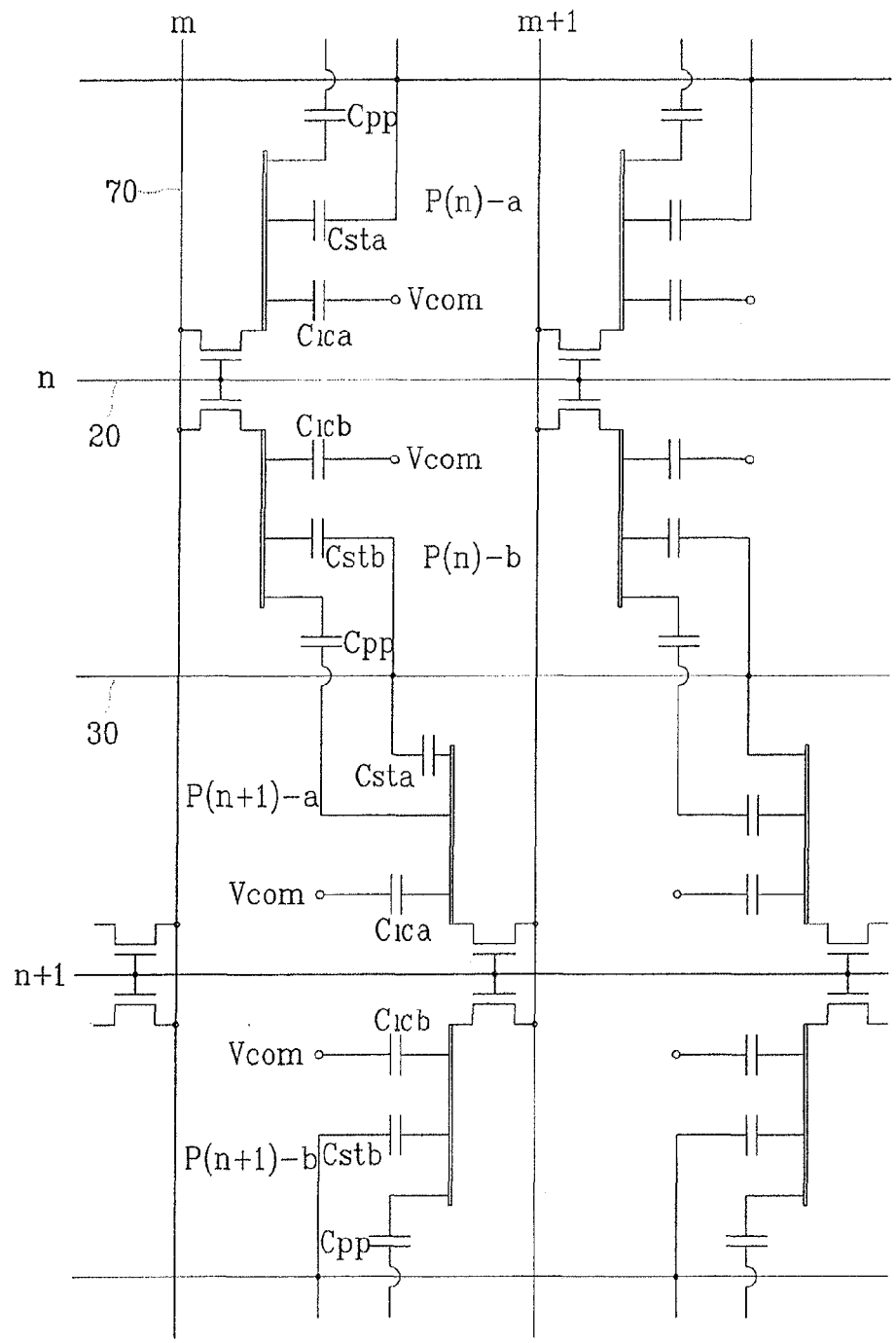
FIG. 14 is an equation circuit diagram of a liquid crystal display with the thin film transistor array panel shown in FIG. 13.

FIG. 13 is a plan view of a liquid crystal display according to a fifth preferred embodiment of the present invention, and FIG. 14 is an equation circuit diagram of a liquid crystal display with the thin film transistor array panel shown in FIG. 13.

In this preferred embodiment, the thin film transistors and the pixel electrodes at one pixel column are alternately connected to two data lines. That is, the thin film transistor and the two pixel electrodes P(n)-a, and P(n)-b at the P(n) pixel are connected to the m-th data line, and the thin film transistor and the two pixel electrodes P(n)-a, and P(n)-b at the P(n+1) pixel are connected to the (m+1)-th data line. The detailed structure of each thin film transistor and pixel electrode is the same as that related to the third preferred embodiment except that the opening portions 95, 510, 520, and 530 are varied in their positions. That is, in the fourth preferred embodiment, the horizontal opening portion 95 is formed at the second pixel electrode 92. The first opening portion 510 is formed at the first pixel electrode 91 while bisecting the latter left and right, and the second and the third opening portions 520 and 530 are formed at the second pixel electrode 92 while trisecting the latter up and down. Consequently, the first pixel electrode 91 forms left and right domains, and the second pixel electrode 92 forms upper and lower domains.

In the above structure, when the dot inversion driving is made, the electric field within the left and right domains is kept to be weaker than that within the upper and lower domains. That is, the electric potential of the first pixel electrode 91 is constantly kept to be lower than that of the second pixel electrode 92 so that the visibility at the left and right sides can be improved.

With the structure shown in FIG. 14, when the dot inversion driving is made, the voltage of the same polarity is applied to the pixel electrodes at the same pixel column so that the same effect as with the column inversion driving is resulted. Therefore, in case the next pixel row indicates the same gray scale as with the previous pixel row (practically, most of the pixels being similar to this case), Vd(n)=Vd(n+1), and Vd(n)=−V'd(n). Therefore, the mathematical formula 2 can be expressed by the following mathematical formula 4:

$$V[P(n)\text{-}b] = Vd(n) + 2Vd(n)Cpp/(Clcb+Cstb+Cpp) = [(Clcb+Cstb+3Cpp)/(Clcb+Cstb+Cpp)]Vd(n) = TVd(n) \quad (4)$$

where T=(Clcb+Cstb+3Cpp)/(Clcb+Cstb+Cpp).

In the mathematical formula 4, the voltage of the P(n)-b pixel is higher than that of the P(n)-a pixel. Therefore, the electric field within the left and right domains is constantly kept to be weaker than that within the upper and lower domains.

As described above, the electric field at the left and right domains is constantly kept to be weaker than the upper and lower domains so that the visibility at the left and right sides can be enhanced.

While the present invention has been described in detail with reference to the preferred embodiments, those skilled in the art will appreciate that various modifications and substitutions can be made thereto without departing from the spirit and scope of the present invention as set forth in the appended claims.

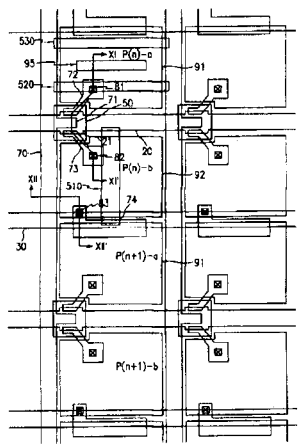

What is claimed is:

1. A liquid crystal display, comprising:
a first substrate;
a pixel electrode comprising a first subpixel electrode and a second subpixel electrode disposed on the first substrate and formed with the same layer;
a second substrate facing the first substrate; and
a liquid crystal layer interposed between the first substrate and the second substrate, wherein the liquid crystal layer on each of the first subpixel electrode and the second subpixel electrode is divided into a plurality of domains, at least one of the plurality of domains being defined by a direction of liquid crystal molecules when an electric field is applied, and a value of an electric field on the second subpixel electrode is weaker than a value of an electric field on the first subpixel electrode, wherein liquid crystal molecules of the liquid crystal layer are aligned substantially in a vertical direction with respect to the first substrate when no electric field is applied.

2. The liquid crystal display of claim 1, further comprising:
a plurality of first signal lines;
a first transistor disposed on the first substrate and connected to the first subpixel electrode; and
a second transistor disposed on the first substrate and connected to the second subpixel electrode.

3. The liquid crystal display of claim 2, wherein the first subpixel electrode is electrically connected to one of the plurality of first signal lines with the first transistor and the second subpixel electrode is electrically connected to the one of the plurality of first signal lines with the second transistor.

4. The liquid crystal display of claim 2, further comprising a plurality of second signal lines, wherein one of the plurality of second signal lines are respectively disposed between two adjacent first signal lines.

5. The liquid crystal display of claim 4, wherein one of the plurality of second signal lines is capacitively coupled with one of the first subpixel electrode and the second subpixel electrode.

6. The liquid crystal display of claim 4, wherein the one of the plurality of second signal lines is capacitively coupled with one of the first and second subpixel electrodes of an adjacent pixel electrode.

7. The liquid crystal display of claim 2, wherein the first subpixel electrode and the second subpixel electrode are paired with each other at opposite sides of one of the first signal lines.

8. The liquid crystal display of claim 1, wherein the domains of the liquid crystal layer are divided by a domain partitioning member.

9. The liquid crystal display of claim 8, wherein the domain partitioning member is formed on the first substrate.

10. The liquid crystal display of claim 9, wherein the domain partitioning member includes a plurality of slits formed in the pixel electrode on the first substrate.

11. The liquid crystal display of claim 10, wherein a width of the slits is about 2 μm to about 5 μm.

12. The liquid crystal display of claim 11, wherein a width of the slits in the first subpixel electrode is different from a width of the slits in the second subpixel electrode.

13. The liquid crystal display of claim 1, wherein the domains of the liquid crystal layer are divided by a domain partitioning member.

14. The liquid crystal display of claim 13, wherein the domain partitioning member is formed on the first substrate.

15. The liquid crystal display of claim 14, wherein the domain partitioning member includes a plurality of slits formed in the pixel electrode on the first substrate.

16. The liquid crystal display of claim 15, wherein a width of the slits is about 2 μm to about 5 μm.

17. The liquid crystal display of claim 16, wherein a width of the slits in the first subpixel elelectrode is different from a width of the slits in the second subpixel electrode.

18. The liquid crystal display of claim 1, wherein a size of the first subpixel electrode is different from a size of the second subpixel electrode.

19. The liquid crystal display of claim 18, wherein the size of the first subpixel electrode is occupied by about 30% to about 70% of a size of the first subpixel electrode and the second subpixel electrode.

20. The liquid crystal display of claim 1, wherein the first subpixel electrode and the second subpixel electrode are insulated from each other.

* * * * *

UNITED STATES PATENT AND TRADEMARK OFFICE
CERTIFICATE OF CORRECTION

| | |
|---|---|
| PATENT NO. | : 8,248,566 B2 |
| APPLICATION NO. | : 12/828790 |
| DATED | : August 21, 2012 |
| INVENTOR(S) | : Jang-Kun Song |

Page 1 of 1

It is certified that error appears in the above-identified patent and that said Letters Patent is hereby corrected as shown below:

Col. 14, lines 9-21

Claims 13 through 17 should be deleted.

Signed and Sealed this
Nineteenth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,248,566 B2
APPLICATION NO. : 12/828790
DATED : August 21, 2012
INVENTOR(S) : Jang-Kun Song It is certified that error appears in the above-identified patent and that said Letters Patent is hereby corrected as shown below:

Delete the title page and substitute therefore the attached title page showing the corrected number of claims in patent.

Col. 14, lines 9-21

Claims 13 through 17 should be deleted.

This certificate supersedes the Certificate of Correction issued March 19, 2013.

Signed and Sealed this
Ninth Day of April, 2013

Teresa Stanek Rea
*Acting Director of the United States Patent and Trademark Office*

(12) United States Patent
Song

(10) Patent No.: US 8,248,566 B2
(45) Date of Patent: Aug. 21, 2012

(54) LIQUID CRYSTAL DISPLAY

(75) Inventor: Jang-Kun Song, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 12/828,790

(22) Filed: Jul. 1, 2010

(65) Prior Publication Data

US 2010/0265423 A1 Oct. 21, 2010

Related U.S. Application Data

(63) Continuation of application No. 11/833,062, filed on Aug. 2, 2007, now Pat. No. 8,031,286, which is a continuation of application No. 10/205,326, filed on Jul. 25, 2002, now Pat. No. 7,460,191.

(30) Foreign Application Priority Data

Nov. 22, 2001 (KR) ................ 2001-72885

(51) Int. Cl.
*G02F 1/136* (2006.01)
*G02F 1/1337* (2006.01)
(52) U.S. Cl. .......... 349/144; 349/48; 349/129; 349/130
(58) Field of Classification Search ............... 349/48, 349/129, 130, 144
See application file for complete search history.

(56) References Cited

U.S. PATENT DOCUMENTS

| 4,878,742 A | 11/1989 | Ohkubo et al. |
| 5,434,690 A | 7/1995 | Hisatake et al. |
| 5,576,863 A | 11/1996 | Aoki et al. |
| 5,598,285 A | 1/1997 | Kondo et al. |
| 5,608,556 A * | 3/1997 | Koma .................. 349/143 |
| 5,737,051 A | 4/1998 | Kondo et al. |

(Continued)

FOREIGN PATENT DOCUMENTS

DE  199 25 985 A1  12/2000

(Continued)

OTHER PUBLICATIONS

Office Action dated Jan. 19, 2011 for U.S. Appl. No. 11/833,062.

(Continued)

*Primary Examiner* — Michael Caley
(74) *Attorney, Agent, or Firm* — F. Chau & Associates, LLC

(57) ABSTRACT

A liquid crystal display includes a first insulating substrate, and a second insulating substrate facing the first insulating substrate. Gate lines are formed on the first insulating substrate while extending in a horizontal direction. A gate insulating layer is formed on the gate lines. A semiconductor layer and data lines are formed on the gate insulating layer. The data lines extend in a vertical direction. Source electrodes are formed on the semiconductor layer while being connected to the data lines. Drain electrodes face the source electrodes. A protective layer is formed on the data lines, and pixel electrodes are formed on the protective layer such that the pixel electrodes are connected to the drain electrodes while having a plurality of slits and horizontal opening portions. A common electrode is formed on the second insulating substrate with a plurality of opening portions. The horizontal opening portions of the pixel electrode and the opening portions of the common electrode partition the pixel region into left and right domains as well as upper and lower domains. The slits are positioned at the left and right domains.

15 Claims, 13 Drawing Sheets